US010644586B2

(12) United States Patent
Alipour

(10) Patent No.: US 10,644,586 B2
(45) Date of Patent: *May 5, 2020

(54) ADAPTIVE POWER CONVERTER TOPOLOGIES SUPPORTING ACTIVE POWER FACTOR CORRECTION (PFC)

(71) Applicant: Raytheon Company, Waltham, MA (US)

(72) Inventor: Saeed Alipour, Laguna Nigel, CA (US)

(73) Assignee: Raytheon Company, Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/437,365

(22) Filed: Jun. 11, 2019

(65) Prior Publication Data

US 2020/0044562 A1 Feb. 6, 2020

Related U.S. Application Data

(63) Continuation of application No. 16/050,019, filed on Jul. 31, 2018, now Pat. No. 10,326,357.

(51) Int. Cl.
*H02M 3/158* (2006.01)
*H02M 1/42* (2007.01)
(Continued)

(52) U.S. Cl.
CPC ....... *H02M 1/4225* (2013.01); *H02M 1/4216* (2013.01); *H02M 1/4233* (2013.01);
(Continued)

(58) Field of Classification Search
CPC ... H02M 2001/0067; H02M 2001/007; H02M 3/156; H02M 3/158; H02M 1/42; H02M 1/4225; H02M 1/4233; H02M 1/4266

See application file for complete search history.

(56) References Cited

U.S. PATENT DOCUMENTS 3,521,150 A 7/1970 Bates
3,992,638 A 11/1976 Sauvanet
(Continued)

FOREIGN PATENT DOCUMENTS

CN 104811061 A 7/2015

OTHER PUBLICATIONS

Chan et al., "Fault Location for the NEPTUNE Power System", IEEE Transactions on Power Systems, vol. 22, No. 2, May 2007, pp. 522-531.

(Continued)

*Primary Examiner* — Gary L Laxton

(57) ABSTRACT

A method includes operating a power converter in a first mode of operation, where the power converter includes multiple first switches and multiple boost diodes coupled to multiple first rails. Each first rail is also coupled to a different one of multiple boost inductors, and the power converter is coupled to multiple second rails. The power converter in the first mode converts electrical power transported between the first and second rails. The method also includes, during the first mode of operation, operating multiple second switches coupled in parallel across the boost diodes as synchronous switches. Each second switch is coupled across a different one of the boost diodes. The method further includes switching the power converter to a second mode of operation in which the first switches are deactivated and the second switches and the boost diodes operate as a full-bridge power converter.

23 Claims, 11 Drawing Sheets

(51) Int. Cl.
*H02M 1/32* (2007.01)
*H02M 7/219* (2006.01)

(52) U.S. Cl.
CPC .... *H02M 1/4266* (2013.01); *H02M 2001/325* (2013.01); *H02M 2007/2195* (2013.01)

(56) References Cited

U.S. PATENT DOCUMENTS

| | | | |
|---|---|---|---|
| 5,200,643 | A | 4/1993 | Brown |
| 5,621,604 | A | 4/1997 | Carlson |
| 6,066,942 | A | 5/2000 | Massie et al. |
| 6,166,455 | A | 12/2000 | Li |
| 6,297,977 | B1 | 10/2001 | Huggett et al. |
| 6,433,444 | B1 | 8/2002 | de Vries |
| 6,835,291 | B2 | 12/2004 | Hudson |
| 6,894,466 | B2 | 5/2005 | Huang et al. |
| 7,992,632 | B2 | 8/2011 | Bornes et al. |
| 8,111,053 | B2 | 2/2012 | Asuke et al. |
| 8,384,236 | B2 * | 2/2013 | Fuma .................. B60L 15/007 307/9.1 |
| 8,749,210 | B1 | 6/2014 | Nakao et al. |
| 9,559,591 | B2 | 1/2017 | Hang et al. |
| 9,997,997 | B2 | 6/2018 | Jacobson et al. |
| 10,326,357 | B1 * | 6/2019 | Alipour ............... H02M 1/4225 |
| 2002/0070718 | A1 | 6/2002 | Rose |
| 2003/0056125 | A1 | 3/2003 | O'Conner et al. |
| 2011/0029788 | A1 | 2/2011 | Domingo et al. |
| 2012/0163035 | A1 | 6/2012 | Song et al. |
| 2013/0202285 | A1 | 8/2013 | Lecroart et al. |
| 2014/0043870 | A1 | 2/2014 | Swamy |
| 2014/0049117 | A1 | 2/2014 | Rahman |
| 2014/0159506 | A1 | 6/2014 | Kim et al. |
| 2016/0181802 | A1 | 6/2016 | Jacobson et al. |
| 2018/0248381 | A1 | 8/2018 | Lewis |
| 2018/0294715 | A1 | 10/2018 | Jacobson et al. |

OTHER PUBLICATIONS

El Forjani et al., "Detection of Fault Location, Monitoring and Control in Underwater Power System", 48th International Universities' Power Engineering Conference (UPEC), Sep. 2013, 6 pages.
Jiang et al., "Technological Study on Distributed Fiber Sensor Monitoring of High Voltage Power Cable in Seafloor", IEEE International Conference on Automation and Logistics, Aug. 2009, pp. 1154-1157.
International Search Report and Written Opinion of the International Searching Authority for PCT Patent Application No. PCT/US2017/059489 dated Mar. 9, 2018, 16 pages.
Choi et al., "A Three-Phase Interleaved DC-DC Converter With Active Clamp for Fuel Cells", IEEE Transactions on Power Electronics, vol. 25, No. 8, Aug. 2010, pp. 2115-2123.
Devi et al., "Ripple Current Reduction in Interleaved Boost Converter by Using Advanced PWM Techniques", 2014 IEEE International Conference on Advanced Communication Control and Computing Technologies (ICACCCT), May 2014, pp. 115-119.
Chen et al. "Modified Interleaved Current Sensorless Control for Three-Level Boost PFC Converter With Considering Voltage Imbalance and Zero-Crossing Current Distortion", IEEE Transactions on Industrial Electronics, vol. 62, No. 11, Nov. 2015, pp. 6896-6904.
Mira et al., "Analysis, Design, Modeling, and Control of an Interleaved-Boost Full-Bridge Three-Port Converter for Hybrid Renewable Energy Systems", IEEE Transactions on Power Electronics, vol. 32, No. 2, Feb. 2017, pp. 1138-1155.
Suraj et al., "Implementation of Interleaved Dual Boost Converter Utilizing FPGA for PWM", IEEE International Conference on Recent Trends in Electronics, Information & Communication Technology (RTEICT), May 2016, pp. 79-83.
Ahn et al., "High-efficiency Bidirectional Three-phase LCC Resonant Converter with a Wide Load Range", IEEE Transactions on Power Electronics, Mar. 2018, 9 pages.
Tezak et al., "Adaptive PWM Control Scheme of Interleaved Boost Converter for AC Traction Application", 14th International Power Electronics and Motion Control Conference (EPE-PEMC 2010), Sep. 2010, pp. T9-72-T9-77.
"AN-1820 LM5032 Interleaved Boost Converter", Texas Instruments Incorporated, Application Report SNVA335A, May 2008, revised May 2013, 13 pages.
Sobrino-Manzanares et al., "Bidirectional, Soft-Switching, Interleaved, Multiphase, Multidevice, Soft-Switching, FGPA-Controlled, Buck-Boost Converter with PWM Real-Time Reconfiguration", IEEE Transactions on Power Electronics, 2017, 13 pages.
Barbosa, "Three-Phased Power Factor Correction Circuits for Low-Cost Distributed Power Systems", Dissertation, Virginia Polytechnic Institute and State University, Jul. 2002, 245 pages.
International Search Report and Written Opinion of the International Searching Authority for PCT Patent Application No. PCT/US2019/030137 dated Aug. 5, 2019, 16 pages.

* cited by examiner

ADAPTIVE POWER CONVERTER TOPOLOGIES SUPPORTING ACTIVE POWER FACTOR CORRECTION (PFC)

CROSS-REFERENCE TO RELATED APPLICATION AND PRIORITY CLAIM

This application is a continuation of U.S. patent application Ser. No. 16/050,019 filed on Jul. 31, 2018 (now U.S. Pat. No. 10,326,357). This application is hereby incorporated by reference in its entirety.

TECHNICAL FIELD

This disclosure is generally directed to power converters. More specifically, this disclosure is directed to adaptive power converter topologies supporting active power factor correction (PFC).

BACKGROUND

Various types of power converters have been developed to convert one form of electrical power into another form of electrical power. Example types of power converters include alternating current-to-direct current (AC-DC) converters and direct current-to-alternating current (DC-AC) inverters. Some power converter topologies have a single power conversion pathway, such as a single pathway used to convert single-phase or three-phase power to a regulated DC output or to convert DC power to a single-phase or three-phase output. Unfortunately, power converters implemented using these topologies typically shut down when a single component in the conversion pathway fails. As a result, these topologies do not address fault management and isolation issues or system reliability issues.

Other power converter topologies use two or more converter modules running in parallel or in an interleaved manner for sharing load power demands. These approaches can help to improve overall converter efficiency and increase the amount of power that is available from the power converters. However, power converters implemented using these topologies still typically shut down when a single component fails in any of the converter modules. As a result, while the use of multiple converter modules can help to improve converter efficiency and increase available power, it does not address fault management and isolation issues or system reliability issues.

SUMMARY

This disclosure provides adaptive power converter topologies supporting active power factor correction (PFC).

In a first embodiment, an apparatus includes multiple boost inductors coupled to multiple first rails, where each boost inductor is coupled to a different one of the first rails. The apparatus also includes multiple first switches and multiple boost diodes coupled to the first rails and forming a power converter. The power converter is also coupled to multiple second rails, and the power converter is configured to convert electrical power transported between the first and second rails. The apparatus further includes multiple second switches each coupled across a different one of the boost diodes. In addition, the apparatus includes a controller configured to control the first and second switches in different operating modes. The operating modes include a first mode in which the first switches and the boost diodes operate as the power converter and the second switches operate as synchronous switches. The operating modes also include a second mode in which the first switches are deactivated and the second switches and the boost diodes operate as a full-bridge power converter.

In a second embodiment, a system includes multiple boost inductors coupled to multiple first rails, where each boost inductor is coupled to a different one of the first rails. The system also includes multiple power converter modules coupled to the first rails, and at least one of the power converter modules is also coupled to multiple second rails. The power converter modules are configured to convert electrical power transported between the first and second rails. The power converter modules collectively include multiple first switches and multiple boost diodes coupled to the first rails and forming a power converter. The power converter modules also collectively include multiple second switches coupled in parallel across the boost diodes, where each second switch is coupled across a different one of the boost diodes. The system further includes a controller configured to control the power converter modules in different operating modes. The operating modes include a first mode in which the first switches and the boost diodes operate as the power converter and the second switches operate as synchronous switches. The operating modes also include a second mode in which the first switches are deactivated and the second switches and the boost diodes operate as a full-bridge power converter.

In a third embodiment, a method includes operating a power converter in a first mode of operation, where the power converter includes multiple first switches and multiple boost diodes coupled to multiple first rails. Each first rail is also coupled to a different one of multiple boost inductors, and the power converter is coupled to multiple second rails. The power converter in the first mode converts electrical power transported between the first and second rails. The method also includes, during the first mode of operation, operating multiple second switches coupled in parallel across the boost diodes as synchronous switches. Each second switch is coupled across a different one of the boost diodes. The method further includes switching the power converter to a second mode of operation in which the first switches are deactivated and the second switches and the boost diodes operate as a full-bridge power converter.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
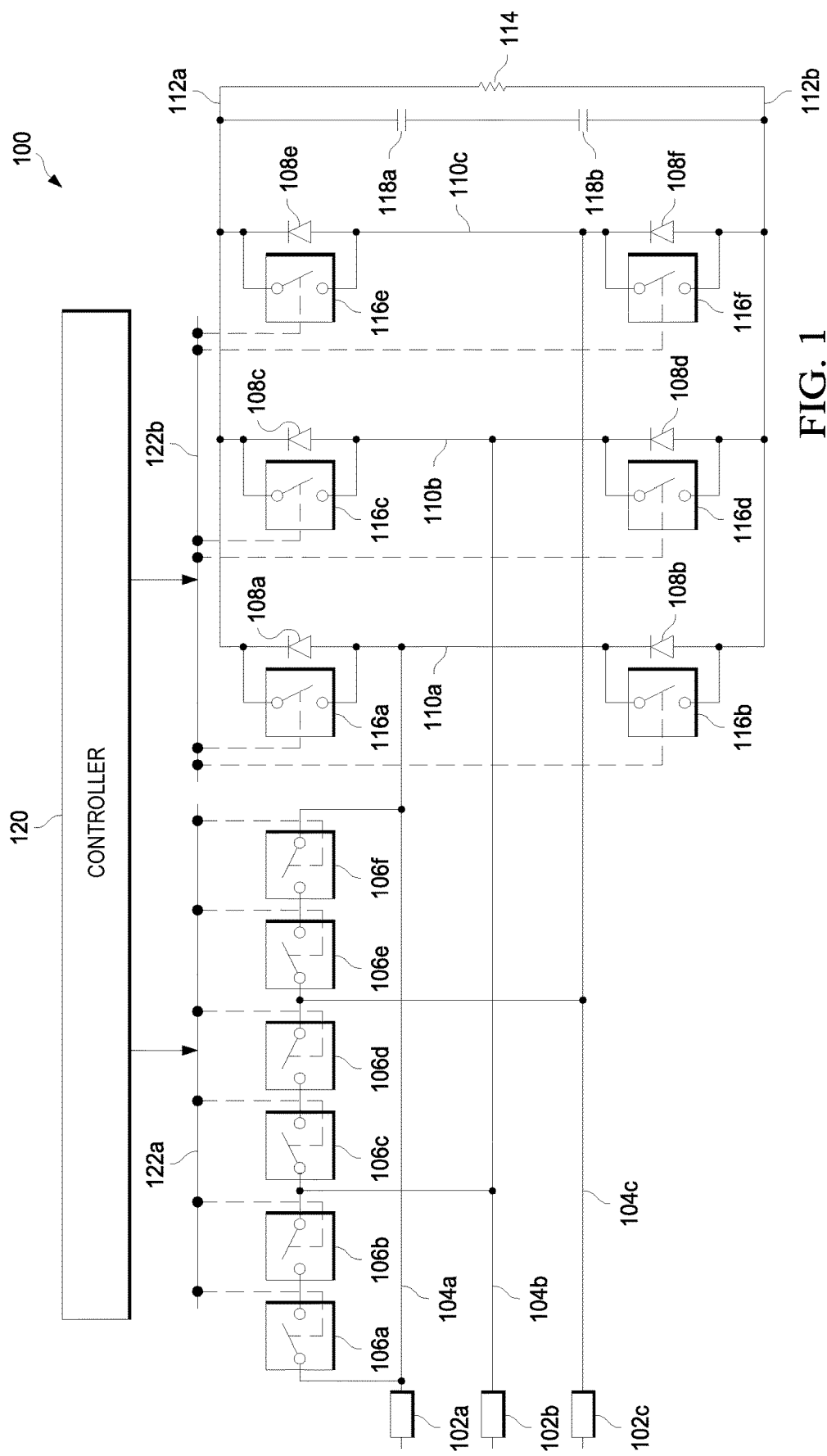
FIG. 1 illustrates a first example adaptive power converter topology according to this disclosure.

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As described above, some power converter topologies use a single power conversion pathway. However, those power converters typically shut down when a single component in the conversion pathway fails. Other power converter topologies use two or more converter modules running in parallel or in an interleaved manner to improve converter efficiency and increase available power. However, these topologies still typically fail when a single component fails. As a result, these topologies do not address fault tolerance management, fault isolation issues, or system reliability issues in single-converter or multi-converter designs.

This disclosure provides various adaptive power converter topologies. Each of these power converter topologies includes boost inductors, switches, and boost diodes implementing a Delta converter, a Vienna converter (also known as a star-connected converter), a three-level or other multi-level converter, or other converter that supports active power factor correction (PFC). Each of these power converter topologies also includes various additional switches coupled in parallel across the boost diodes. These additional switches can operate as synchronous switches in order to reduce losses and increase efficiency of the power converter when the power converter is operating normally. In the event of a fault (such as a failed switch in the power converter), the additional switches can be reconfigured so that the power converter operates as a full-bridge power converter. In this way, these power converter topologies help to provide fault tolerance management, fault isolation, and improve system reliability.

Moreover, in some embodiments, a power converter includes multiple converter modules, and each converter module supports at least part of one of the power converter topologies disclosed here. In some embodiments, at least one of the converter modules could support fault management or isolation and improved system reliability in the same manner discussed above. Not only that, since multiple converter modules can be used in a parallel or interleaved manner, this helps to provide improved converter efficiency, improved load sharing, and improved converter reliability. In addition, a faulty converter module can be isolated if needed, and the remaining converter module or modules can be operated using an adaptive control and fault tolerance management technique. Thus, one or more converter modules in a power converter may fail or otherwise go offline without affecting the output of the power converter and without requiring the power converter to operate at a partial rating.

In these power converter topologies, a digital control algorithm can be used to automatically adjust control signals that are provided to components in a power converter. For example, the digital control algorithm can adjust the operation of the additional switches in a power converter topology in order to control whether the power converter topology is operating normally or as a full-bridge converter. Also, the digital control algorithm can adjust the operation of one or more converter modules when one or more other converter modules go offline. Overall, this can help the power converter to isolate one or more failed components while the remaining components of the power converter continue delivering power without interruption to a load.

It should be noted that, for ease of explanation, the various power converter topologies described below are often described as being used to perform AC-to-DC power conversion. However, the same or similar power converter topologies could also be used to perform other power conversion functions, such as DC-to-AC power inversion or DC-to-DC power conversion. Also, the power converter topologies discussed below may be described as being unidirectional in some configurations and bidirectional in other configurations, in which cases those power converter topologies could be reconfigured as needed to transform electrical energy in a desired direction. Thus, phrases like "input rails" and "output rails" are used merely for convenience when describing the unidirectional configurations of the power converter topologies and do not limit the power converter topologies to specific directions of power conversion in all configurations. In addition, the power converter topologies discussed below may be used with either a single-phase AC signal or a three-phase AC signal through suitable control of the various switches in the power converter topologies.

FIG. 1 illustrates a first example adaptive power converter topology 100 according to this disclosure. As shown in FIG. 1, the power converter topology 100 includes multiple boost inductors 102a-102c, which are coupled to multiple input rails 104a-104c of the converter topology 100. The boost inductors 102a-102c are configured to receive an AC input signal (such as a three-phase AC input signal) and to provide electrical energy over the input rails 104a-104c. The input rails 104a-104c couple the boost inductors 102a-102c to other components of the power converter topology 100. Each boost inductor 102a-102c includes any suitable inductive structure having any suitable inductance. In some embodiments, each boost inductor 102a-102c is sized to operate at twice the switching frequency of switches in the power converter topology 100 or higher (depending at least in part on the number of converter modules used as described below in connection with FIGS. 5A through 6). Each input rail 104a-104c includes any suitable conductive pathway.

Six switches 106a-106f are coupled to the input rails 104a-104c, and six boost diodes 108a-108f are also coupled to the input rails 104a-104c. In this example, the switches 106a-106f and boost diodes 108a-108f are configured to operate as a Delta converter (or a Delta rectifier) in order to convert the AC input signal into a DC output signal. This structure is referred to as a Delta (or Δ) converter since the six switches 106a-106f are functionally arranged in a triangle, where each side of the triangle includes two switches 106a-106b, 106c-106d, 106e-106f and each corner of the triangle is coupled to a different one of the input rails 104a-104c. By operating the switches 106a-106f appropriately, the switches 106a-106f and boost diodes 108a-108f convert an AC input signal into a DC output signal. Each switch 106a-106f includes any suitable structure configured to selectively form and break electrical connections, such as a power metal-oxide-semiconductor field-effect transistor (MOSFET) or other power transistor.

The boost diodes 108a-108f operate to restrict current flow through various circuit branches 110a-110c. Each circuit branch 110a-110c includes two of the boost diodes 108a-108b, 108c-108d, 108e-108f coupled in series, and one of the input rails 104a-104c is coupled between the series-coupled boost diodes in each circuit branch 110a-110c. The different circuit branches 110a-110c are connected to different ones of the input rails 104a-104c, and the circuit branches 110a-110c are connected in parallel between two output rails 112a-112b. Collectively, the boost diodes 108a-108f help to ensure that a DC current flows through the output rails 112a-112b and is provided to a load 114 (which in this example is represented by a resistance). Each boost diode 108a-108f includes any suitable structure configured to limit current flow to a single direction. Each circuit branch 110a-110c and output rail 112a-112b includes any suitable conductive pathway.

Additional switches 116a-116f are coupled in parallel across the boost diodes 108a-108f, respectively. In particular, each additional switch 116a-116f is coupled in parallel across one of the boost diodes 108a-108f, and different switches 116a-116f are coupled across different boost diodes 108a-108f The additional switches 116a-116f operate to selectively provide electrical pathways around the boost diodes 108a-108f Each additional switch 116a-116f includes any suitable structure configured to selectively form and break electrical connections, such as a power MOSFET or other power transistor.

During normal operation (when all switches 106a-106f are operating correctly), the additional switches 116a-116f operate as synchronous switches. During this time, each of the additional switches 116a-116f can be closed when its associated boost diode 108a-108f is supposed to be conducting current and opened when its associated boost diode 108a-108f is supposed to be blocking current. In this mode of operation, each of the additional switches 116a-116f becomes conductive synchronously with its associated boost diode 108a-108f Since the additional switches 116a-116f have a lower voltage drop compared to the boost diodes 108a-108f, this helps to reduce losses in the topology 100 and increase the efficiency of the topology 100.

If one or more of the switches 106a-106f fail, the operation of the topology 100 can be adjusted in order to provide fault tolerance management or fault isolation within the topology 100. More specifically, any remaining operational switches 106a-106f can be opened or closed as needed in order to ensure that the AC input signal is properly provided to the boost diodes 108a-108f. In this mode of operation, the additional switches 116a-116f can then be operated so that the boost diodes 108a-108f and the additional switches 116a-116f implement a full-bridge power converter. In this way, the topology 100 can remain functional and provide power conversion functionality even in the presence of one or more faults. Moreover, the topology 100 can be altered by adjusting the control signals for the switches 106a-106f, 116a-116f to change operation of the topology 100 between a bidirectional full-bridge converter and a unidirectional Delta, Vienna, or other converter when needed.

One or more capacitors 118a-118b are coupled in parallel across the load 114 and between the output rails 112a-112b. The capacitors 118a-118b are used to store and release electrical energy in order to smooth the DC output provided to the load 114. Active power factor correction is done though the control of the switches 106a-106f, 116a-116f in the topology 100. Active power factor correction involves changing the power factor of an electrical system, where the power factor is defined as the ratio between real power and apparent power. Each capacitor 118a-118b includes any suitable capacitive structure having any suitable capacitance.

In this example, the switches 106a-106f, 116a-116f in the topology 100 are controlled using a controller 120. For example, the controller 120 can generate pulse width modulation (PWM) control signals for the switches 106a-106f, 116a-116f, where the duty cycle of each PWM control signal is adjustable by the controller 120 to control how often the associated switch 106a-106f, 116a-116f is conductive or non-conductive. The controller 120 can also implement a digital control algorithm that adapts the operation of the topology 100 to changing conditions. For instance, the controller 120 can control the switches 106a-106f, 116a-116f during the normal mode of operation so that the topology 100 operates normally. The controller 120 can also open or close all operational switches 106a-106f as needed in the event of a fault and control the switches 116a-116f so that the topology 100 operates in a full-bridge mode of operation.

The controller 120 includes any suitable structure configured to generate control signals for switches of a power converter topology. The controller 120 could, for example, represent one or more microprocessors, microcontrollers, digital signal processors (DSPs), field programmable gate arrays (FPGAs), application-specific integrated circuits (ASICs), or discrete circuitry. In this example, the controller 120 outputs two sets of control signals over two signal buses, and two demultiplexers 122a-122b separate the control signals sent over the signal buses into individual control signals feeding the switches 106a-106f, 116a-116f Note, however, that this is not required and that other approaches could be used to control the various switches 106a-106f, 116a-116f For instance, the controller 120 could include a separate output for controlling each of the switches 106a-106f, 116a-116f, or other numbers of signal buses and demultiplexers could be used (including one signal bus and one demultiplexer).

Figure 2:
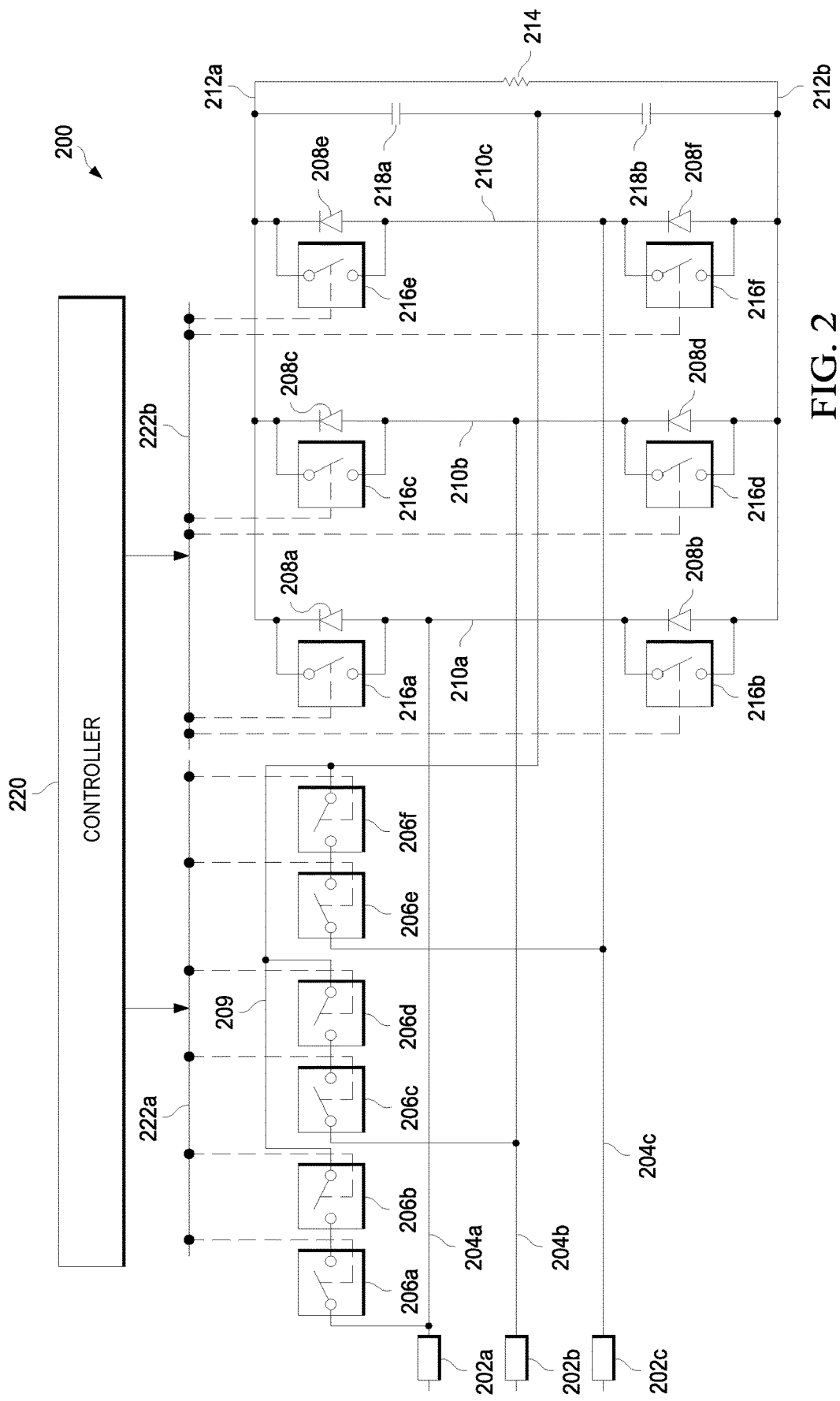
FIG. 2 illustrates a second example adaptive power converter topology according to this disclosure.

FIG. 2 illustrates a second example adaptive power converter topology 200 according to this disclosure. The topology 200 shown in FIG. 2 is similar in structure to the topology 100 shown in FIG. 1. As shown in FIG. 2, the topology 200 includes boost inductors 202a-202c, input rails 204a-204c, switches 206a-206f, boost diodes 208a-208f, circuit branches 210a-210c, output rails 212a-212b, load 214, additional switches 216a-216f, capacitors 218a-218b, controller 220, and demultiplexers 222a-222b. These components could be the same as or similar to the corresponding components shown in FIG. 1 and described above.

In FIG. 2, the switches 206a-206f are not arranged in a Delta or triangular configuration. Instead, the switches 206a-206f and boost diodes 208a-208f are arranged to implement a Vienna converter (or a Vienna rectifier) in order to convert an AC input signal into a DC output signal. In this configuration, the switches 206a-206f are arranged in three pairs of series-coupled switches 206a-206b, 206c-206d, 206e-206f Each pair of series-coupled switches 206a-206b, 206c-206d, 206e-206f is coupled to a different one of the input rails 204a-204c and to a common signal line 209. The signal line 209 is also coupled between the two capacitors 218a-218b. During normal operation, the switches 206a-206f and boost diodes 208a-208f in this configuration operate as a Vienna converter.

If one or more of the switches 206a-206f fail, the operation of the topology 200 can be adjusted in order to provide fault tolerance management or fault isolation within the topology 200. More specifically, any remaining operational switches 206a-206f can be opened or closed as needed in order to ensure that the AC input signal is properly provided to the boost diodes 208a-208f. In this mode of operation, the additional switches 216a-216f can then be operated so that the boost diodes 208a-208f and the additional switches 216a-216f implement a full-bridge power converter. In this way, the topology 200 can remain functional and provide power conversion functionality even in the presence of one or more faults. Moreover, the topology 200 can be altered by adjusting the control signals for the switches 206a-206f, 216a-216f to change operation of the topology 200 between a bidirectional full-bridge converter and a unidirectional Delta, Vienna, or other converter when needed.

Figure 3A:
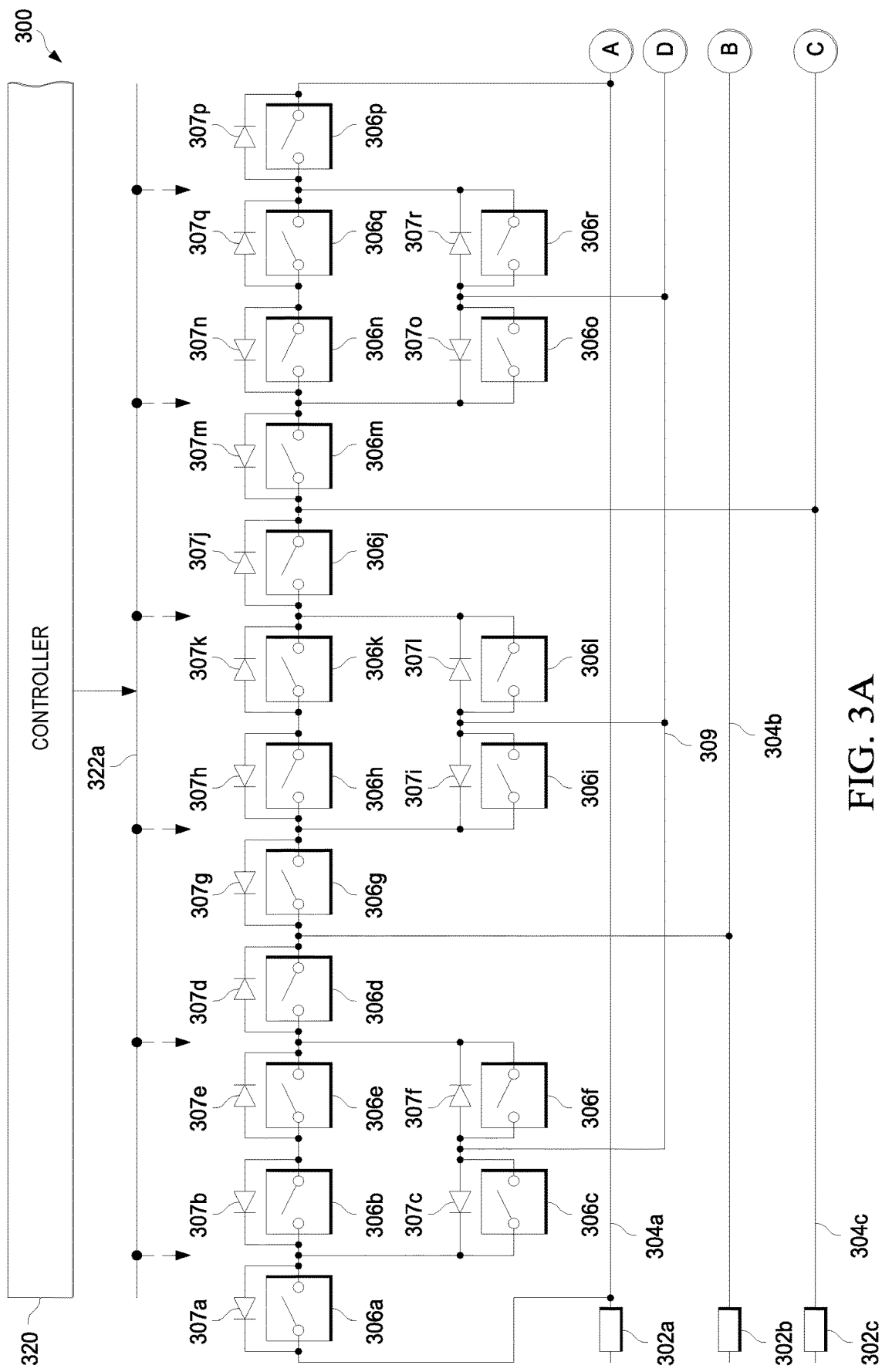
FIGS. 3A and 3B illustrate a third example adaptive power converter topology according to this disclosure.
Figure 3B:
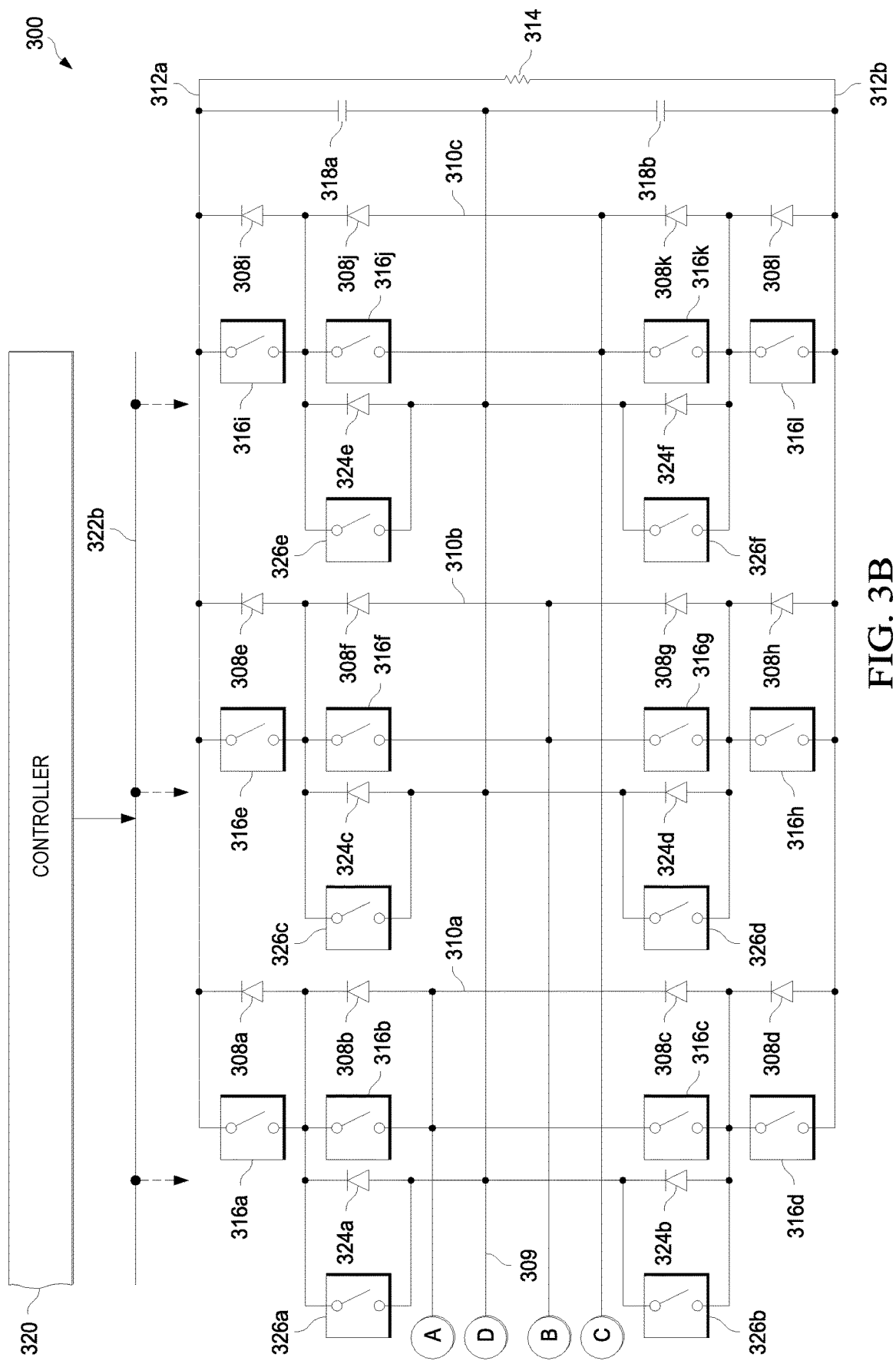

FIGS. 3A and 3B illustrate a third example adaptive power converter topology 300 according to this disclosure. As shown in FIGS. 3A and 3B, the topology 300 includes boost inductors 302a-302c and input rails 304a-304c, which could be the same as or similar to the corresponding components shown in FIGS. 1 and 2 and described above.

The topology 300 also implements a three-level converter structure that includes switches 306a-306r, each of which is coupled in parallel across a corresponding diode 307a-307r. The switches 306a-306r and diodes 307a-307r are generally arranged in three groups here. The first group includes switches 306a-306f and diodes 307a-307f, the second group includes switches 306g-306l and diodes 307g-307l, and the third group includes switches 306m-306r and diodes 307m-307r.

In the first group, the switches 306a, 306b, 306d, 306e are coupled in series with each other, and each switch 306a, 306b, 306d, 306e is coupled in parallel with a corresponding one of the diodes 307a, 307b, 307d, 307e. The diodes 307c and 307f are respectively coupled in parallel across the switches 306b and 306e, and the switches 306c and 306f are respectively coupled in parallel across the diodes 307c and 307f. The switch 306a is coupled to one of the input rails 104a, and the switch 306d is coupled to another of the input rails 104b. A node between the switches 306c and 306f and between the diodes 307c and 307f is coupled to a signal line 309. The second and third groups have a similar arrangement. However, the second group is coupled to the input rails 104b and 104c, and the third group is coupled to the input rails 104a and 104c. A controller 320 controls the operation of the switches 306a-306r, optionally through at least one demultiplexer 322a. It should be noted that while shown as implementing a Delta converter here, a Vienna converter or other converter could also be used here. If implemented as a Vienna converter, the outputs of the switches 306d, 306j, and 306p can be coupled to a common signal line.

The topology 300 further includes boost diodes 308a-308l, circuit branches 310a-310c, additional switches 316a-316l, diodes 324a-324f, and additional switches 326a-326f. These components are again arranged in three groups. The first group includes the boost diodes 308a-308d, circuit branch 310a, additional switches 316a-316d, diodes 324a-324b, and additional switches 326a-326b. The second group includes the boost diodes 308e-308h, circuit branch 310b, additional switches 316e-316h, diodes 324c-324d, and additional switches 326c-326d. The third group includes the boost diodes 308i-308l, circuit branch 310c, additional switches 316i-316l, diodes 324e-324f, and additional switches 326e-326f.

In the first group, the boost diodes 308a-308d are coupled in series along the circuit branch 310a, and one of the additional switches 316a-316d is coupled in parallel across each of the boost diodes 308a-308d. The diode 324a is coupled to the signal line 309, and the additional switch 326a is coupled in parallel across the diode 324a. The diode 324a is also coupled between the additional switches 316a-316b and between the boost diodes 308a-308b. Similarly, the diode 324b is coupled to the signal line 309, and the additional switch 326b is coupled in parallel across the diode 324b. The diode 324b is also coupled between the additional switches 316c-316d and between the boost diodes 308c-308d. The boost diode 308a and the additional switch 316a are also coupled to an output rail 312a, and the boost diode 308d and the additional switch 316d are also coupled to an output rail 312b. The boost diodes 308b-308c and the additional switches 316b-316c are coupled to one of the input rails 304a. The second and third groups have a similar arrangement, but the second and third groups are coupled to the input rails 304b and 304c, respectively.

The three groups of components are coupled in parallel with each other and to the output rails 312a-312b. The output rails 312a-312b are also coupled to a load 314 and to two capacitors 318a-318b. The capacitors 318a-318b are coupled in series between the output rails 312a-312b, and the signal line 309 is coupled between the capacitors 318a-318b. The controller 320 controls the operation of the additional switches 316a-316l and the additional switches 326a-326f, optionally through at least one demultiplexer 322b.

During normal operation, the switches 306a-306r are controlled so that the topology 300 implements a Delta, Vienna, or other power converter functionality, and the additional switches 316a-316l and 326a-326f are controlled to operate as synchronous switches for their associated diodes 308a-308l and 324a-324f. If one or more of the switches 306a-306r fail, the operation of the topology 300 can be adjusted in order to provide fault tolerance management or fault isolation within the topology 300. More specifically, any remaining operational switches 306a-306r can be opened or closed as needed in order to ensure that the AC input signal is properly provided to the diodes 308a-308l. In this mode of operation, the additional switches 316a-316l and 326a-326f can then be operated so that the diodes 308a-308l and 324a-324f and the additional switches 316a-316l and 326a-326f implement a full-bridge power converter. In this way, the topology 300 can remain functional and provide power conversion functionality even in the presence of one or more faults. Moreover, the topology 300 can be altered by adjusting the control signals for the switches 306a-306r, 316a-316l, 326a-326f to change operation of the topology 300 between a bidirectional full-bridge converter and a unidirectional Delta, Vienna, or other converter when needed.

Figure 4A:
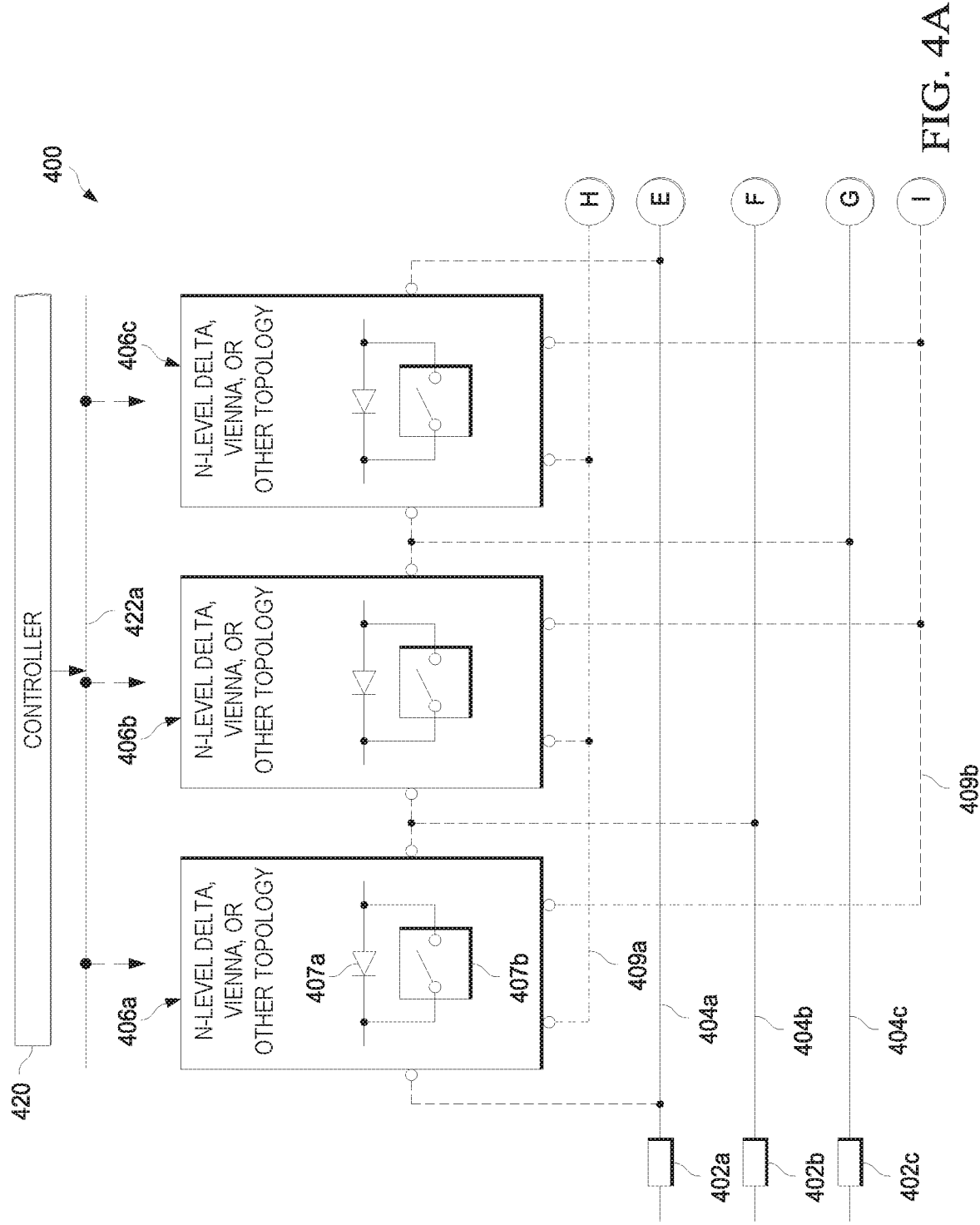
FIGS. 4A and 4B illustrate a fourth example adaptive power converter topology according to this disclosure.
Figure 4B:
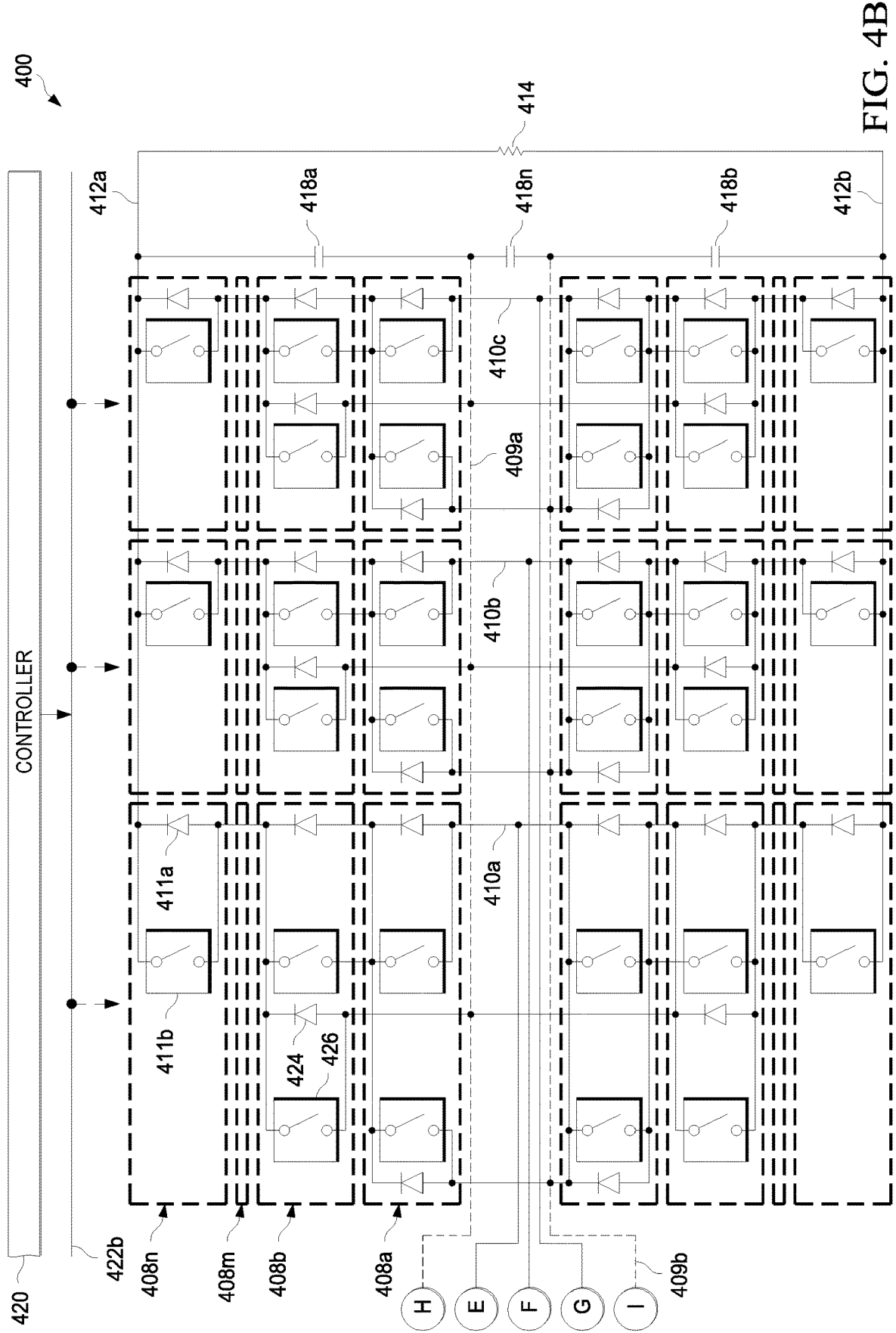

FIGS. 4A and 4B illustrate a fourth example adaptive power converter topology 400 according to this disclosure. The topology 400 is shown here in generalized form to indicate that the topology 400 supports an N-level converter structure, where N is greater than or equal to three. As shown in FIGS. 4A and 4B, the topology 400 includes boost inductors 402a-402c and input rails 404a-404c, which could be the same as or similar to the corresponding components described above.

The topology 400 also includes multiple N-level sets 406a-406c of diodes 407a and switches 407b that are coupled in parallel across the diodes 407a. The numbers of diodes 407a and switches 407b used here depend on the number of levels used in the topology 400, and each level of diodes 407a and switches 407b can include one less diode 407a and one less switch 407b than an adjacent level. The sets 406a-406c are coupled to signal lines 409a-409b. The switches 407b in the sets 406a-406c are controlled by a controller 420, optionally through at least one demultiplexer 422a. The switches 407b here could form part of an N-level Delta converter, Vienna converter, or other converter.

The topology 400 further includes multiple sets of N levels 408a-408n of boost diodes 411a and additional switches 411b coupled between the input rails 404a-404c and two output rails 412a-412b. The boost diodes 411a in the levels 408a-408n of each set are coupled in series along one of multiple circuit branches 410a-410c. Each of the additional switches 411b is coupled across one of the boost diodes 411a. At least some levels 408a-408n also include additional diodes 424 and additional switches 426. The diodes 424 are coupled to the signal lines 409a-409b, and each additional switch 426 is coupled across one of the additional diodes 424.

The output rails 412a-412b are coupled to a load 414 and to N capacitors 418a-418n. The capacitors 418a-418n are coupled in series between the output rails 412a-412b, and the signal lines 409a-409b are coupled between different pairs of the capacitors 418a-418n. The controller 420 controls the operation of the additional switches 411b and the additional switches 426, optionally through at least one demultiplexer 422b.

During normal operation, the switches 407b are controlled so that the topology 400 implements a Delta, Vienna, or other power converter functionality, and the additional switches 411b and 426 are controlled to operate as synchronous switches for their associated diodes 411a and 424. If one or more of the switches 407b fail, the operation of the topology 400 can be adjusted in order to provide fault tolerance management or fault isolation within the topology 400. More specifically, any remaining operational switches 407b can be opened or closed as needed in order to ensure that the AC input signal is properly provided to the diodes 411a. In this mode of operation, the additional switches 411b and 426 can then be operated so that the diodes 411a and 424 and the additional switches 411b and 426 implement a full-bridge power converter. In this way, the topology 400 can remain functional and provide power conversion functionality even in the presence of one or more faults. Moreover, the topology 400 can be altered by adjusting the control signals for the switches 407b, 411b, 426 to change operation of the topology 400 between a bidirectional full-bridge converter and a unidirectional Delta, Vienna, or other converter when needed.

The topologies 100 and 200 shown in FIGS. 1 and 2 can be used for lower-voltage inputs and outputs, such as inputs and outputs of up to about 1,000 volts. The topology 300 shown in FIGS. 3A and 3B can be used for higher-voltage inputs and outputs, such as inputs and outputs of greater than 800 volts. The topology 400 shown in FIGS. 4A and 4B can be used for even higher-voltage inputs and outputs, such as inputs and outputs above about 2,000 volts. Note, however, that these values are examples only and that each of the topologies 100-400 could be used with any suitable voltages or voltage ranges.

The various topologies 100-400 described above can provide various benefits or advantages depending on the implementation. For example, as noted above, the various additional switches added to the topologies 100-400 can be used as synchronous switches in order to reduce losses and increase efficiencies in the topologies. These additional switches can also be used to reconfigure the topologies 100-400 into full-bridge converters in response to certain faults, which helps to provide fault tolerance management or fault isolation and improve operational reliability. This can be achieved even in multi-level converter architectures, enabling use of this functionality in higher-voltage applications. Further, these topologies 100-400 support the ability to switch between unidirectional and bidirectional converters when required or desired. In addition, the controllers in the topologies 100-400 support the ability to perform active power factor correction and adaptive control, enabling the topologies to more effectively deliver power to loads under varying conditions.

Although FIGS. 1 through 4B illustrate examples of adaptive power converter topologies, various changes may be made to FIGS. 1 through 4B. For example, the topologies could implement other converters or rectifiers besides Delta and Vienna converters. Also, the power converter topologies shown here could include any suitable number of levels of a converter structure as needed for a given application.

Figure 5A:
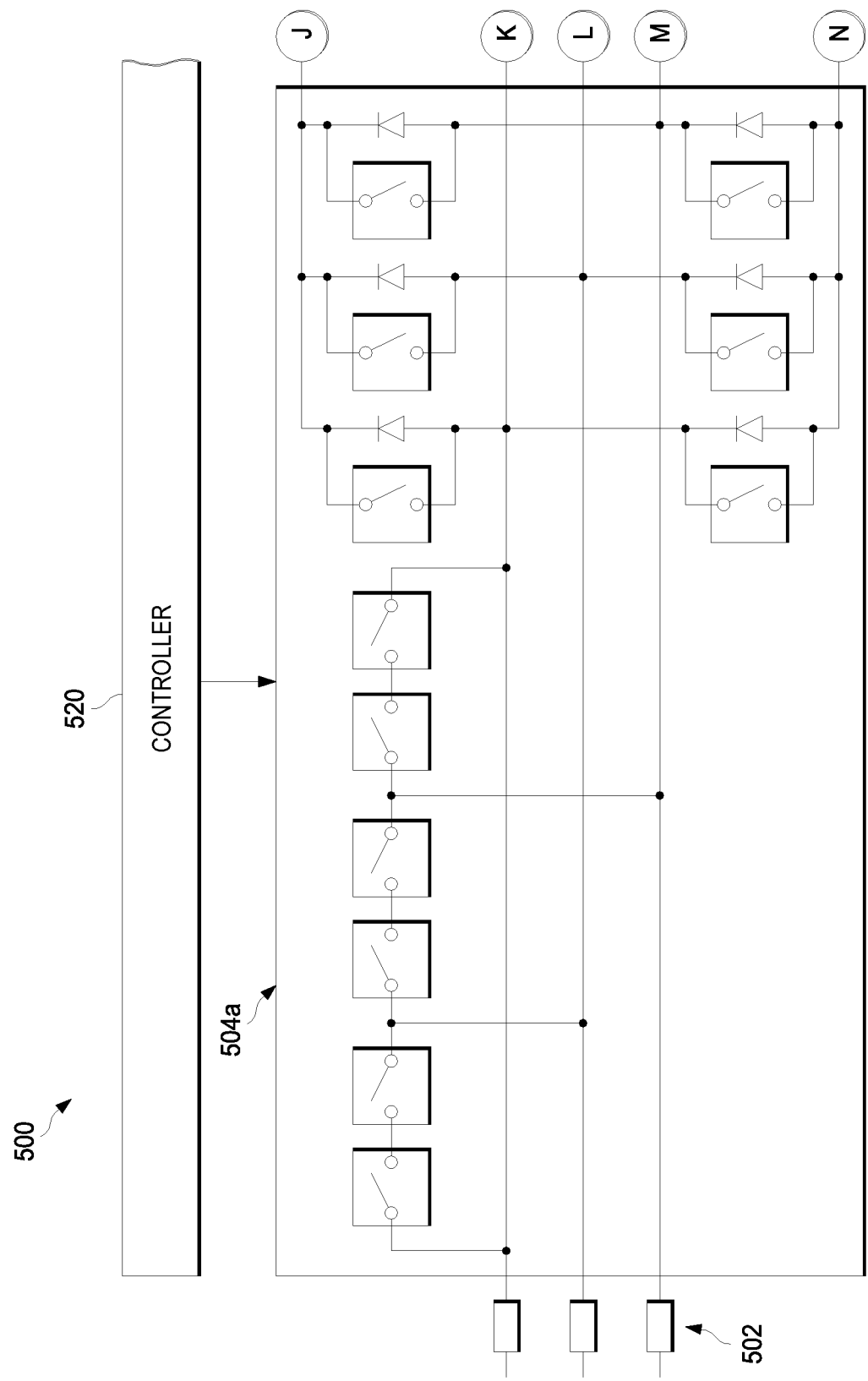
FIGS. 5A and 5B illustrate a first example adaptive power converter topology supporting parallel or interleaved converter modules according to this disclosure.
Figure 5B:
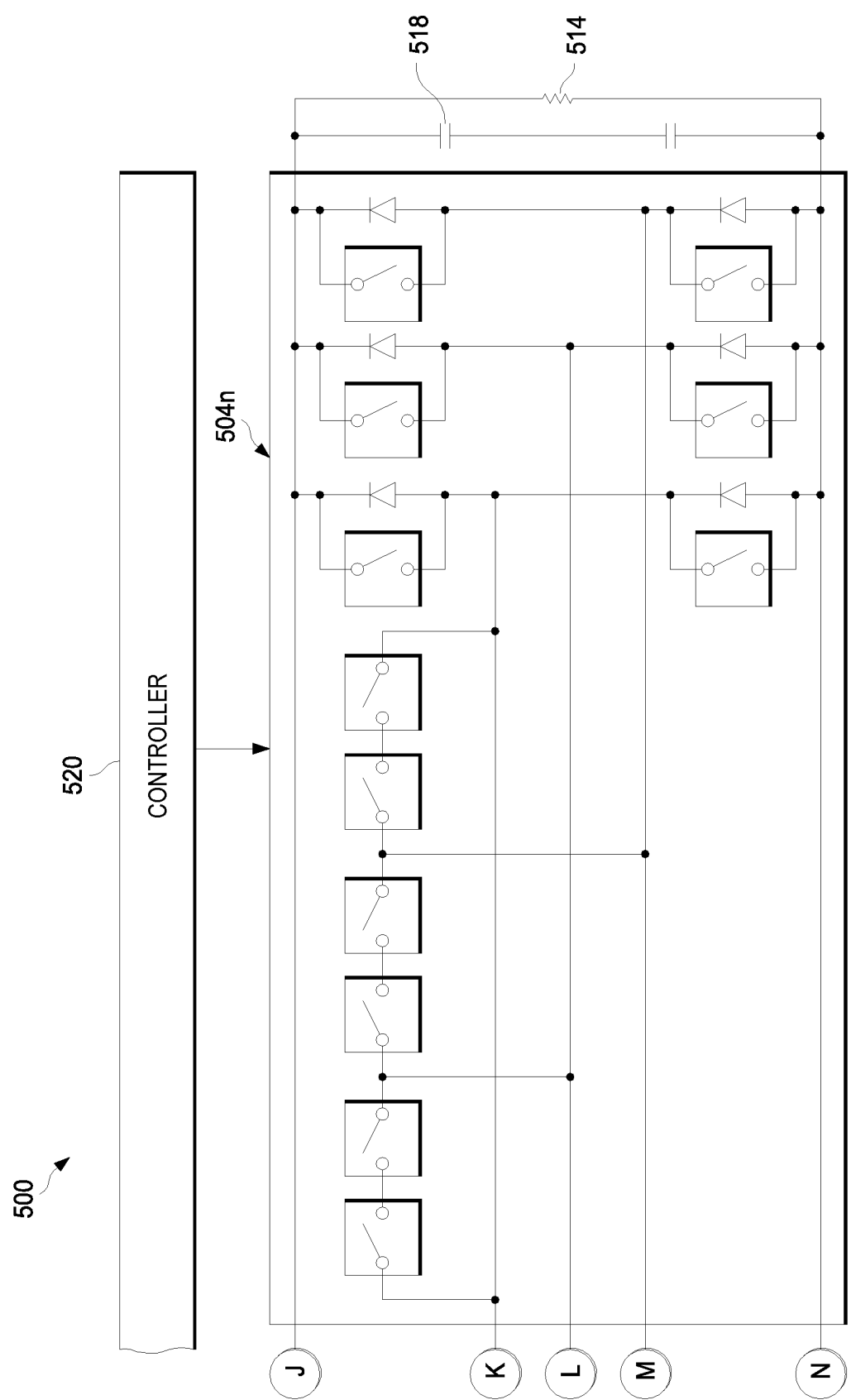

FIGS. 5A and 5B illustrate a first example adaptive power converter topology 500 supporting parallel or interleaved converter modules according to this disclosure. As shown in FIGS. 5A and 5B, the topology 500 includes multiple boost inductors 502, which are coupled to multiple input rails. The topology 500 also includes a load 514, one or more capacitors 518, and a controller 520. Although not shown here, the controller 520 could provide control signals to various components of the topology 500 via one or more demultiplexers. These components can be the same as or similar to corresponding components described above.

The topology 500 further includes two or more converter modules 504a-504n, each of which is coupled to the input rails. Each of the converter modules 504a-504n can implement one of the topologies 100-400 discussed above. In this example, each of the converter modules 504a-504n implements the topology 100 of FIG. 1. To couple converter modules 504a-504n that support the topology 100, the input rails 104a-104c of the different converter modules 504a-504n can be coupled together, and the output rails 112a-112b of the different converter modules 504a-504n can be coupled together. If the topology 200 is used, the input rails 204a-204c of the different converter modules 504a-504n can be coupled together, the signal lines 209 of the different converter modules 504a-504n can be coupled together, and the output rails 212a-212b of the different converter modules 504a-504n can be coupled together. If the topology 300 is used, the input rails 304a-304c of the different converter modules 504a-504n can be coupled together, the signal lines 309 of the different converter modules 504a-504n can be coupled together, and the output rails 312a-312b of the different converter modules 504a-504n can be coupled together. If the topology 400 is used, the input rails 404a-404c of the different converter modules 504a-504n can be coupled together, the signal lines 409a-409b of the different converter modules 504a-504n can be coupled together, and the output rails 412a-412b of the different converter modules 504a-504n can be coupled together.

The controller 520 here supports the ability to modify operation of the converter modules 504a-504n, such as by reconfiguring one or more converter modules as full-bridge converters in response to a fault or when bidirectional power conversion is needed. The controller 520 can also vary the number of converter modules 504a-504n that are actively performing power conversion operations and control which converter modules 504a-504n are actively performing power conversion operations. In some embodiments, all of the converter modules 504a-504n could operate in parallel to perform power conversion. In other embodiments, the converter modules 504a-504n could operate in an interleaved manner, where one or some of the converter modules perform power conversion while at least one other converter module is inactive. As a particular example, the controller 520 could control the converter modules 504a-504n so that only one converter module is active at a given time, such as when the converter modules 504a-504n are operated sequentially. Each of the converter modules 504a-504n can be operated at the same switching frequency, and the boost inductors 502 can be operated at twice the switching frequency or higher (depending on the number of converter modules used).

This type of interleaved operation may be more robust than operating all of the converter modules 504a-504n in parallel. This is because some of the converter modules 504a-504n can provide redundancy for one or more failed converter modules 504a-504n. During interleaved operation, each of the converter modules 504a-504n may operate 1/N of the time. If one of the converter modules 504a-504n fails, the other converter modules 504a-504n can easily be adapted to operate 1/(N−1) of the time. This helps to reduce or eliminate any negative impacts to one or more loads 514 being powered. This type of interleaved operation may also distribute heat generation more evenly, such as when each converter module 504a-504n generates 1/N of the heat in the system. Further, higher overall efficiencies can be achievable when multiple smaller converter modules are used, such as when two 5 kW converter modules are more efficient than a single 10 kW converter module. Moreover, the boost inductors 502 can be operated at higher switching frequencies rather than the switches, enabling a smaller overall system size to be obtained. In addition, this approach allows various components, such as boost inductors, output capacitors, and other components like electromagnetic interference (EMI) filters, to be used for all of the converter modules 504a-504n. Again, this helps to reduce the size of the overall system.

Figure 6:
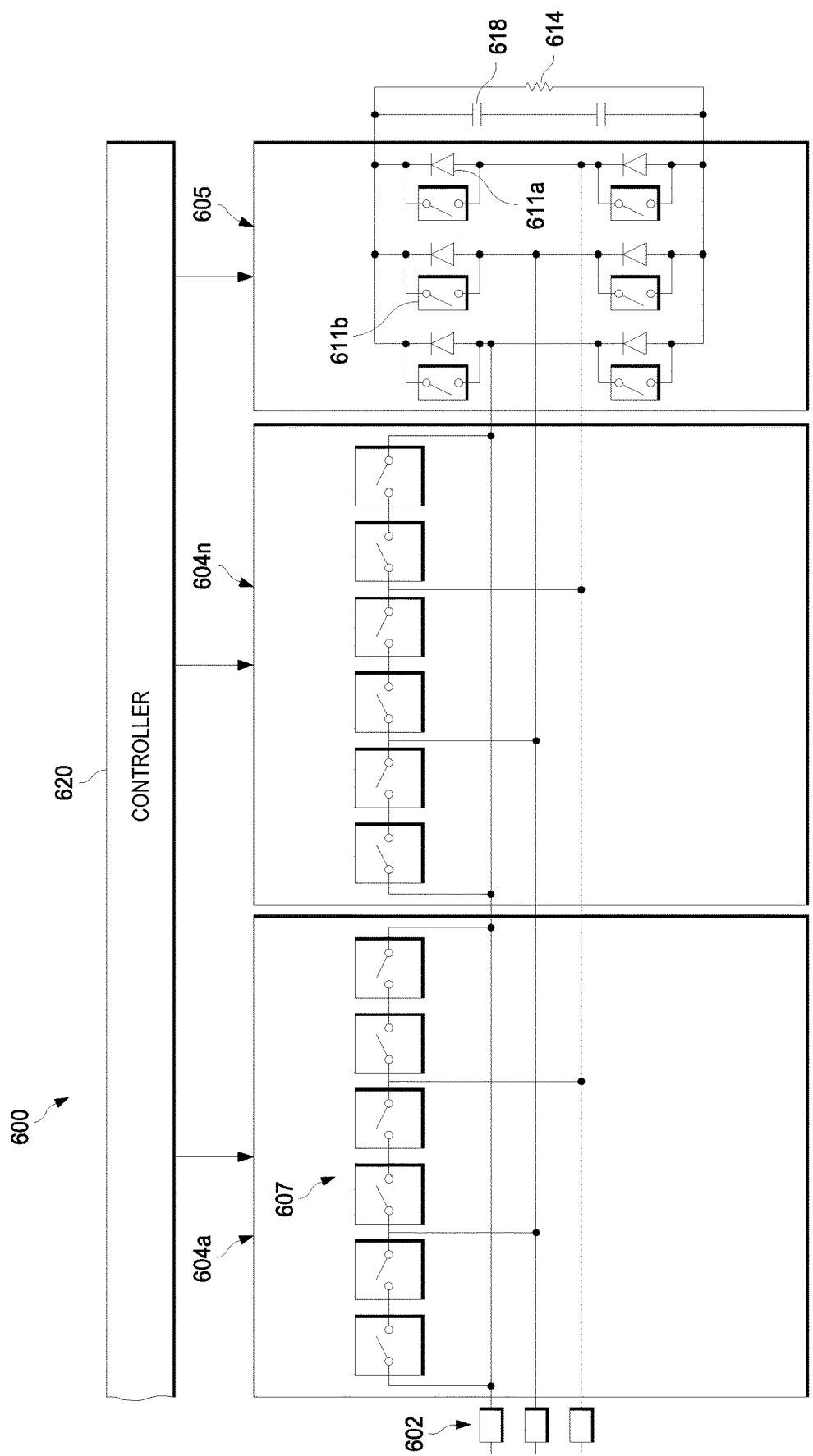
FIG. 6 illustrates a second example adaptive power converter topology supporting parallel or interleaved converter modules according to this disclosure.

FIG. 6 illustrates a second example adaptive power converter topology 600 supporting parallel or interleaved converter modules according to this disclosure. As shown in FIG. 6, the topology 600 includes multiple boost inductors 602, which are coupled to multiple input rails. The topology 600 also includes a load 614, one or more capacitors 618, and a controller 620. Although not shown here, the controller 620 could provide control signals to various components of the topology 600 via one or more demultiplexers. These components can be the same as or similar to corresponding components described above.

The topology 600 further includes two or more converter modules 604a-604n and a shared final converter module 605. Unlike the topology 500 in which each converter module 504a-504n includes boost diodes and additional switches coupled across the boost diodes, the converter modules 604a-604n here lack boost diodes and additional switches coupled across the boost diodes. Instead, each of the converter modules 604a-604n include various switches 607 that are used to implement a Delta converter as in FIG. 1 (although the switches 607 and optionally diodes could also be used to implement a Vienna converter, a multi-level Delta converter, a multi-level Vienna converter, or other converter as described above).

The shared final converter module 605 here includes boost diodes 611a and additional switches 611b coupled across the boost diodes 611a. Thus, the boost diodes 611a and additional switches 611b are shared by all of the converter modules 604a-604n in this example (in addition to sharing components such as boost inductors, output capacitors, and EMI filters). Note that while shown here as having the same configuration as in FIGS. 1 and 2, the boost diodes 611a and additional switches 611b could have a multi-level arrangement (such as one shown in FIGS. 3A through 4B). The additional switches 611b can be operated as described above to function as synchronous switches in order to reduce losses and increase efficiency of the power converter topology 600 when operating normally. In the event of a fault (such as when all modules 604a-604n have at least one failed switch 607 each), the additional switches 611b can be reconfigured so that the power converter topology 600 operates as a full-bridge power converter.

The controller 620 here supports the ability to modify operation of the converter modules 604a-604n and the shared final converter module 605, such as by reconfiguring the shared final converter module 605 as a full-bridge converter in response to a fault or when bidirectional power conversion is needed. The controller 620 can also vary the number of converter modules 604a-604n that are actively performing power conversion operations and control which converter modules 604a-604n are actively performing power conversion operations. In some embodiments, all of the converter modules 604a-604n could operate in parallel to perform power conversion. In other embodiments, the converter modules 604a-604n could operate in an interleaved manner, where one or some of the converter modules perform power conversion while other converter modules are inactive. As a particular example, the controller 620 could control the converter modules 604a-604n so that only one converter module is active at a given time, such as when the converter modules 604a-604n are operated sequentially. Each of the converter modules 604a-604n can be operated at the same switching frequency, and the boost inductors 602 can be operated at twice the switching frequency or higher depending on the number of converter modules used. For the same reasons discussed above with respect to the topology 500, this type of interleaved operation may be more robust than operating all of the converter modules 604a-604n in parallel.

Various other features or functions can be supported by the topologies 500 and 600. For example, it is possible to turn off one or more of the converter modules 504a-504n, 604a-604n while the remaining converter modules 504a-504n, 604a-604n remain active so that the deactivated converter modules 504a-504n, 604a-604n can be replaced. This supports hot-swap of the deactivated converter modules 504a-504n, 604a-604n while enabling power to continue to be supplied to a load. Moreover, if cooling becomes problematic with one or more of the converter modules 504a-504n, 604a-604n, those converter modules 504a-504n, 604a-604n could be deactivated or operated for less time to help improve cooling of those converter modules 504a-504n, 604a-604n. Again, the digital control algorithm used by the controller 520, 620 can be used to help adapt operation of the topology 500, 600 to changing conditions.

Although FIGS. 5A through 6 illustrate examples of adaptive power converter topologies 500 and 600 supporting parallel or interleaved converter modules, various changes may be made to FIGS. 5A through 6. For example, each of the topologies 500 and 600 could include any suitable number of converter modules, and those converter modules could be used in any suitable parallel or interleaved manner.

Figure 7:
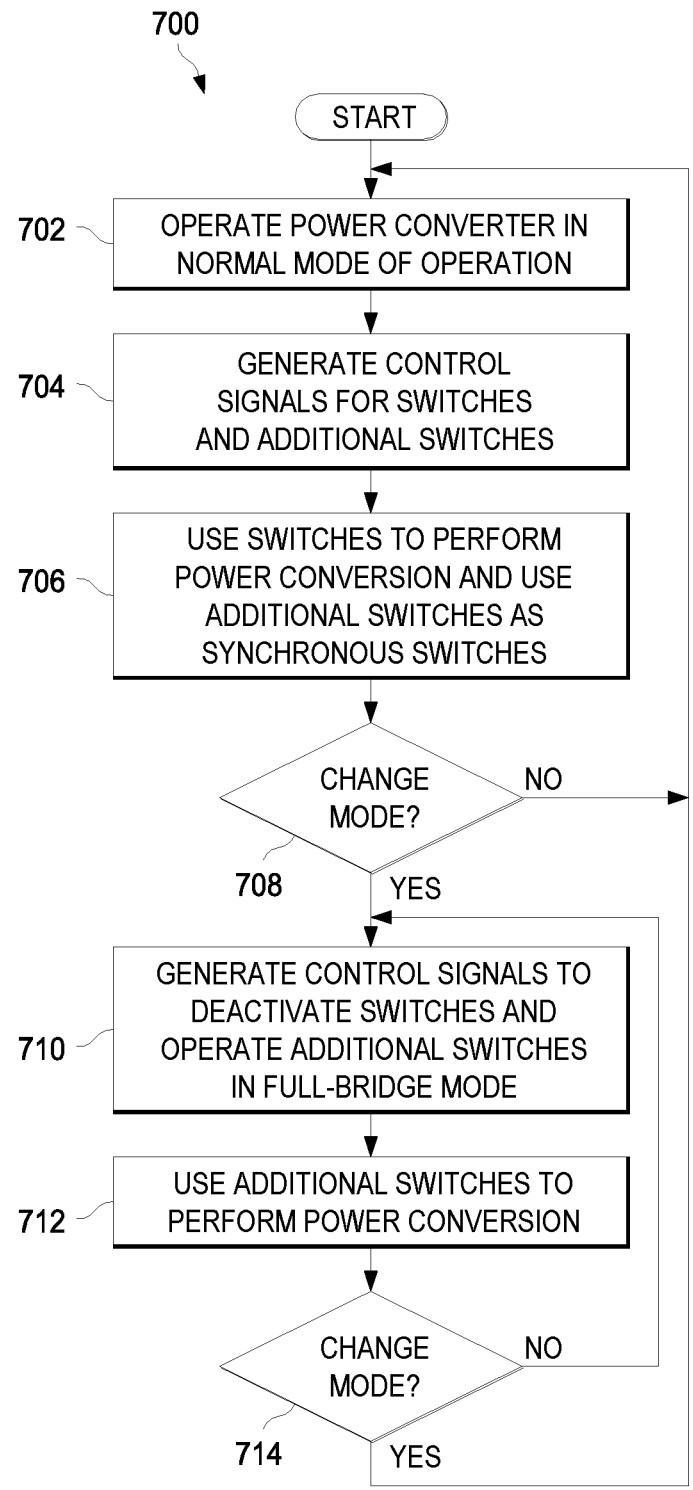
FIG. 7 illustrates an example method for adaptive power conversion using a power converter according to this disclosure.

FIG. 7 illustrates an example method 700 for adaptive power conversion using a power converter according to this disclosure. For ease of explanation, the method 700 is described as being implemented using one of the topologies 100-400 described above. However, the method 700 could be used with any suitable power converter topology.

As shown in FIG. 7, a power converter is operated in a normal mode of operation at step 702. This could include, for example, all components of the power converter topology 100-400 operating correctly without fault and without a need for bidirectional transfer. During this time, control signals are generated for switches and additional switches of the power converter at step 704. This could include, for example, an FPGA or other controller 120, 220, 320, 420 generating PWM control signals for the switches 106a-106f, 206a-206f, 306a-306r, 407b. This could also include the FPGA or other controller 120, 220, 320, 420 generating PWM control signals for the additional switches 116a-116f, 216a-216f, 316a-316l, 326a-326f, 411b, 426. The switches are used to perform power conversion and the additional switches are used as synchronous switches at step 706. This could include, for example, the switches 106a-106f, 206a-206f, 306a-306r, 407b operating in conjunction with the diodes 108a-108f, 208a-208f, 308a-308l, 324a-324f, 411a, 424 to function as a Delta, Vienna, or other converter. This could also include the additional switches 116a-116f, 216a-216f, 316a-316l, 326a-326f, 411b, 426 operating as synchronous switches for their associated diodes 108a-108f, 208a-208f, 308a-308l, 324a-324f, 411a, 424.

As long as there is no need to change the power converter's mode of operation at step 708, the process continues to generate control signals and perform power conversion in the normal mode. A mode change may be needed in various circumstances, such as when a fault develops in one or more of the switches 106a-106f, 206a-206f, 306a-306r, 407b in the power converter or when the power converter needs to engage in bidirectional power transfer.

If a mode change is needed, control signals are generated to deactivate the switches and to operate the additional switches in full-bridge mode at step 710. This could include, for example, the FPGA or other controller 120, 220, 320, 420 generating PWM control signals that turn off the switches 106a-106f, 206a-206f, 306a-306r, 407b. This could also include the FPGA or other controller 120, 220, 320, 420 generating PWM control signals for the additional switches 116a-116f, 216a-216f, 316a-316l, 326a-326f, 411b, 426. The additional switches are used to perform power conversion at step 712. This could include, for example, the additional switches 116a-116f, 216a-216f, 316a-316l, 326a-326f, 411b, 426 operating in conjunction with the diodes 108a-108f, 208a-208f, 308a-308l, 324a-324f, 411a, 424 to function as a full-bridge converter.

Again, as long as there is no need to change the power converter's mode of operation at step 714, the process continues to generate control signals and perform power conversion in the full-bridge mode. A mode change may be needed again in various circumstances, such as when any fault is resolved or when the power converter needs to engage in unidirectional power transfer. If the mode does change at step 714, the process returns to step 702 to operate the power converter in the normal mode of operation.

Although FIG. 7 illustrates one example of a method 700 for adaptive power conversion using a power converter, various changes may be made to FIG. 7. For example, while shown as a series of steps, various steps in FIG. 7 could overlap, occur in parallel, occur in a different order, or occur any number of times.

Figure 8:
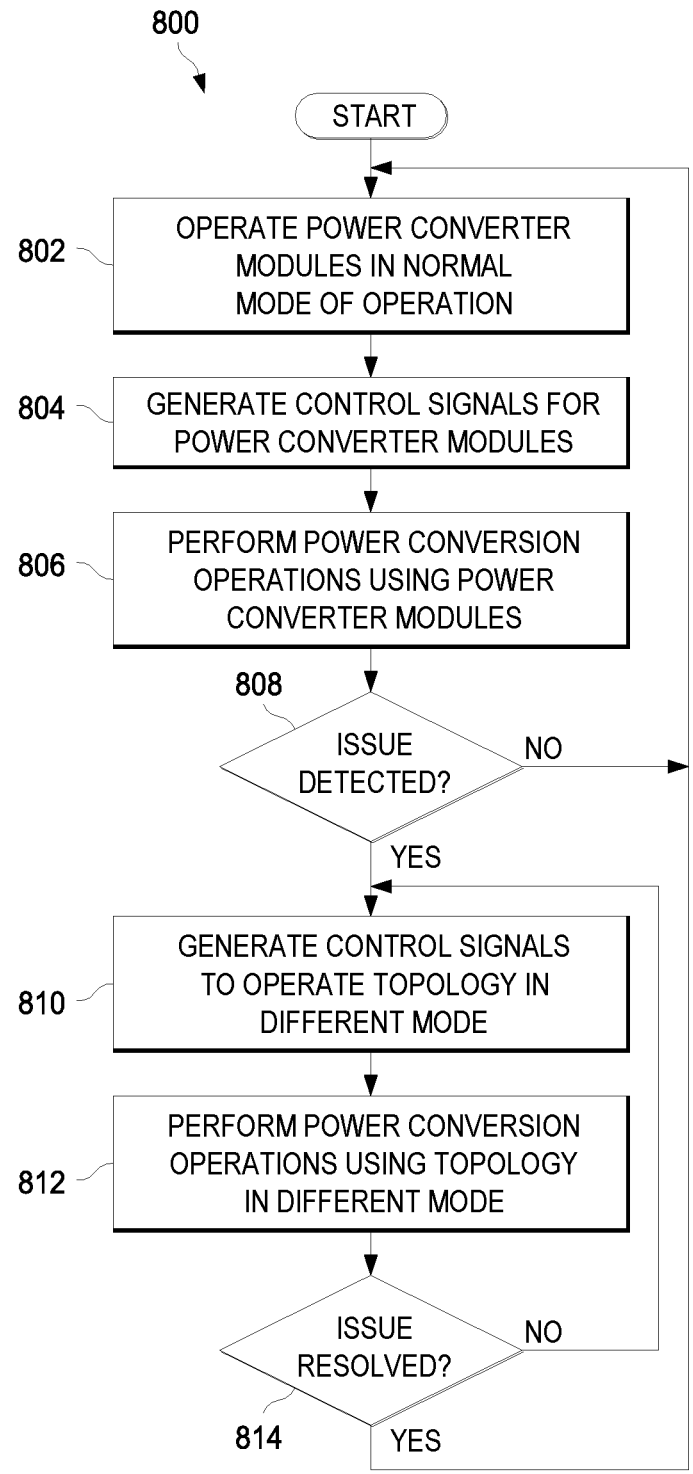
FIG. 8 illustrates an example method for adaptive power conversion using a power converter with multiple converter modules according to this disclosure.

FIG. 8 illustrates an example method 800 for adaptive power conversion using a power converter with multiple converter modules according to this disclosure. For ease of explanation, the method 800 is described as being implemented using one of the topologies 500 and 600 described above. However, the method 800 could be used with any suitable power converter topology.

As shown in FIG. 8, multiple power converter modules are operated in a normal mode of operation at step 802. This could include, for example, all components of the power converter topology 500 or 600 operating correctly without fault and without a need for bidirectional transfer. During this time, control signals are generated for the power converter modules at step 804. This could include, for example, an FPGA or other controller 520 or 620 generating PWM control signals for the switches and additional switches in the controller modules 504a-504n or for switches in the controller modules 604a-604n and additional switches in the final converter module 605. The controller modules are used to perform power conversion at step 806. This could include, for example, the switches in the controller modules 504a-504n or 604a-604n operating in conjunction with the diodes in the controller modules 504a-504n or the final converter module 605 to function as a Delta, Vienna, or other converter. This could also include the additional switches of the controller modules 504a-504n or the final converter module 605 operating as synchronous switches. In some cases, the controller module 504a-504n or 604a-604n can be operated sequentially or in some other interleaved manner.

As long as there is no issue detected, the process continues to generate control signals and perform power conversion using the controller modules in the normal mode of operation. An issue may be detected in various circumstances, such as when a fault occurs in one or more of the controller modules, when a hot-swap of one or more controller modules is needed, or when one or more controller modules become too hot or need cooling.

If an issue is detected requiring a mode change, control signals are generated to operate the topology in a different mode at step 810, and power conversion is performed by the topology in the different mode at step 812. This could include, for example, the FPGA or other controller 520 or 620 generating PWM control signals that turn off one or more of the controller modules 504a-504n or 604a-604n. This could also include the FPGA or other controller 520 or 620 generating PWM control signals for the remaining controller modules 504a-504n or 604a-604n to cause the remaining controller modules 504a-504n or 604a-604n to generate the desired or required power output. Alternatively, this could include the FPGA or other controller 520 or 620 generating PWM control signals that turn off all of the controller modules 604a-604n and generating PWM control signals that cause the boost diodes 611a and the additional switches 611b to operate as a full-bridge converter. In this way, the converter topology 500 or 600 can continue to provide power to a load 514 or 614 with little or no interruption. As long as the issue is not resolved at step 814, the process continues to generate control signals and perform power conversion in the different mode. If the issue is resolved at step 814, the process returns to step 802 to operate the converter modules in the normal mode of operation.

Although FIG. 8 illustrates one example of a method 800 for adaptive power conversion using a power converter with multiple converter modules, various changes may be made to FIG. 8. For example, while shown as a series of steps, various steps in FIG. 8 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 202(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 202(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   multiple boost inductors, each boost inductor coupled to a different one of multiple first rails;
   multiple boost diodes, each boost diode coupled between one of the first rails and one of multiple second rails;
   multiple first switches coupled to the first rails between the boost inductors and the boost diodes;
   multiple second switches, each second switch coupled across a different one of the boost diodes; and
   a controller configured to control the first and second switches in different operating modes, wherein the operating modes include:
      a first mode in which (i) the first switches and the boost diodes operate as a first type of power converter that is configured to convert electrical power transported between the first and second rails and (ii) each of the second switches operates as a synchronous switch and becomes conductive synchronously with the associated boost diode; and
      a second mode in which (i) the first switches are turned off and (ii) the second switches and the boost diodes operate as a second type of power converter that is configured to convert the electrical power transported between the first and second rails.

2. The apparatus of claim 1, wherein:
   the first type of power converter is configured to convert the electrical power unidirectionally from the first rails to the second rails;
   the second type of power converter is configured to convert the electrical power bidirectionally between the first and second rails; and
   the controller is configured to determine whether to operate in the first mode or the second mode depending on whether unidirectional or bidirectional power conversion is needed.

3. The apparatus of claim 1, wherein the controller is configured to determine to operate in the second mode in response to detecting a fault associated with one of the first switches.

4. The apparatus of claim 1, further comprising:
   multiple capacitors coupled in series between the second rails; and
   at least one signal line, each signal line coupled to some of the first switches and coupled between two of the capacitors.

5. The apparatus of claim 1, wherein:
   the boost diodes include multiple sets of boost diodes, each set of boost diodes comprising diodes coupled in series between one of the first rails and one of the second rails; and
   the apparatus further comprises:
      at least one signal line coupled to some of the first switches;
      additional diodes coupled to the boost diodes, the second switches, and the at least one signal line; and
      multiple third switches, each third switch coupled across one of the additional diodes.

6. The apparatus of claim 1, wherein:
   the first type of power converter comprises one of: a Delta converter and a Vienna converter; and
   the second type of power converter comprises a full-bridge power converter.

7. The apparatus of claim 1, wherein the first type of power converter comprises a multi-level converter.

8. A system comprising:
multiple boost inductors, each boost inductor coupled to a different one of multiple first rails;
multiple power converter modules coupled to the first rails, at least one of the power converter modules also coupled to multiple second rails, wherein the power converter modules collectively comprise:
   multiple boost diodes, each boost diode coupled between one of the first rails and one of the second rails;
   multiple first switches coupled to the first rails between the boost inductors and the boost diodes; and
   multiple second switches, each second switch coupled across a different one of the boost diodes; and
a controller configured to control the power converter modules in different operating modes, wherein the operating modes include:
   a first mode in which (i) the first switches and the boost diodes operate as a first type of power converter that is configured to convert electrical power transported between the first and second rails and (ii) each of the second switches operates as a synchronous switch and becomes conductive synchronously with the associated boost diode; and
   a second mode in which (i) the first switches are turned off and (ii) the second switches and the boost diodes operate as a second type of power converter that is configured to convert the electrical power transported between the first and second rails.

9. The system of claim 8, wherein each of the power converter modules comprises a different set of first switches, a different set of second switches, and a different set of boost diodes.

10. The system of claim 8, wherein:
two or more of the power converter modules comprise different sets of first switches; and
a final one of the power converter modules comprises the second switches and the boost diodes.

11. The system of claim 8, wherein:
the first type of power converter is configured to convert the electrical power unidirectionally from the first rails to the second rails;
the second type of power converter is configured to convert the electrical power bidirectionally between the first and second rails; and
the controller is configured to determine whether to operate in the first mode or the second mode depending on whether unidirectional or bidirectional power conversion is needed.

12. The system of claim 8, wherein the controller is configured to determine to operate in the second mode in response to detecting a fault associated with one of the first switches.

13. The system of claim 8, further comprising:
multiple capacitors coupled in series between the second rails; and
at least one signal line, each signal line coupled to some of the first switches and coupled between two of the capacitors.

14. The system of claim 8, wherein:
the boost diodes include multiple sets of boost diodes, each set of boost diodes comprising diodes coupled in series between one of the first rails and one of the second rails; and
the power converter modules further collectively comprise:
   at least one signal line coupled to some of the first switches;
   additional diodes coupled to the boost diodes, the second switches, and the at least one signal line; and
   multiple third switches, each third switch coupled across one of the additional diodes.

15. The system of claim 8, wherein:
the first type of power converter comprises one of: a Delta converter and a Vienna converter; and
the second type of power converter comprises a full-bridge power converter.

16. The system of claim 8, wherein the first type of power converter comprises a multi-level converter.

17. The system of claim 8, wherein the controller is further configured to:
operate at least some of the power converter modules in an interleaved manner such that one or some of the power converter modules perform power conversion while at least one other power converter module is inactive; and
in response to a failure of one or more of the power converter modules, adjust operation of one or more remaining power converter modules in order to continuously supply power to a load.

18. A method for operating a power converter, the method comprising:
in a first mode of operation:
   operating first switches and boost diodes as a first type of power converter to convert electrical power transported between multiple first rails and multiple second rails, each boost diode coupled between one of the first rails and one of the second rails, each first rail also coupled to a different one of multiple boost inductors, the first switches coupled to the first rails between the boost inductors and the boost diodes; and
   operating second switches, each of which is coupled across a different one of the boost diodes, as synchronous switches such that each of the second switches becomes conductive synchronously with the associated boost diode; and
in a second mode of operation:
   turning off the first switches; and
   operating the second switches and the boost diodes as a second type of power converter that is configured to convert the electrical power transported between the first and second rails.

19. The method of claim 18, wherein:
the power converter comprises multiple converter modules; and
each of the converter modules comprises a different set of first switches, a different set of second switches, and a different set of boost diodes.

20. The method of claim 18, wherein:
the power converter comprises multiple converter modules;
two or more of the converter modules comprise different sets of first switches; and
a final one of the converter modules comprises the second switches and the boost diodes.

21. The method of claim 18, wherein:
the power converter comprises multiple converter modules; and
the method further comprises, in response to a fault with one or more of the converter modules, adjusting operation of one or more remaining converter modules in order to continuously supply power to a load.

22. The method of claim 18, wherein:
- the first type of power converter is configured to convert the electrical power unidirectionally from the first rails to the second rails;
- the second type of power converter is configured to convert the electrical power bidirectionally between the first and second rails; and
- the method further comprises determining whether to operate in the first mode or the second mode depending on whether unidirectional or bidirectional power conversion is needed.

23. The method of claim 18, wherein the method further comprises determining to operate in the second mode in response to detecting a fault associated with one of the first switches.

* * * * *